Patented Jan. 28, 1941

2,230,206

UNITED STATES PATENT OFFICE 2,230,206

MANUFACTURE OF CERAMIC WARES

Ira Elmer Sproat, Westport, Conn., assignor to R. T. Vanderbilt Company, Incorporated, New York, N. Y., a corporation of New York No Drawing. Application April 14, 1938,
Serial No. 202,010

10 Claims. (Cl. 106—11)

This invention relates to the manufacture of improved ceramics. It relates more particularly to ceramic products having decreased moisture expansion and tendency to craze, together with improved firing characteristics, color, and increased economy of manufacture.

Earthenware bodies are commonly made from a mixture of clay, flint and feldspar, and may include pyrophyllite, talc, etc. The proportions of clay, flint and feldspar used in making earthenware bodies vary considerably depending upon the characteristics which are desired in the final ceramic products.

Most ceramic products prepared from clay, flint and feldspar expand upon absorbing moisture. This expansion causes crazing of the glaze on many products such as wall tile, etc. The present invention provides improved ceramic products having a greatly decreased moisture expansion, and a corresponding decreased tendency to craze. These new products have other important advantages, such as improved firing characteristics, economy of manufacture, etc.

In accordance with the present invention, ceramic products are prepared from bodies containing zoisitic rock, which advantageously replaces a substantial part of or all of the feldspar commonly used, and may even replace some of the flint commonly used. The term "zoisitic rock" as used in this specification and claims is used to designate materials containing a substantial proportion of zoisite, together with substantial proportions of sodium and potassium aluminum silicates, such as albite and sericite.

The amount of zoisitic rock used in producing the new ceramics may be varied; but advantageously the proportion used should be such as to provide from 0.3% to 5% of calcium, calculated as calcium oxide. When the zoisitic rock is used in these proportions in the bodies, the ceramics obtained have a radically decreased moisture expansion without any marked decrease in firing range.

A naturally occurring zoisitic rock found near Piney River, Virginia, has important advantages for use in accordance with the present invention. This rock is composed chiefly of zoisite, albite, sericite and microcline with accessory minerals of titanite, garnet, apatite, clino-zoisite and quartz. The chemical analysis of the rock is approximately as follows:

| | Per cent |
|---|---|
| $SiO_2$ | 58.72 |
| $Al_2O_3$ | 24.70 |
| $CaO$ | 6.90 |
| $Na_2O$ | 5.58 |
| $K_2O$ | 2.70 |
| $TiO_2$ | 0.12 |
| $Fe_2O_3$ | 0.30 |

The mineral content of several thin sections of this rock as determined by traversing selected areas under the microscope is approximately as follows:

| | Per cent |
|---|---|
| Albite | 60–70 |
| Microcline | 5 |
| Sericite | 10–20 |
| Zoisite | 15–20 |
| Quartz and minor minerals 5% or less. | |

While this analysis is largely an approximation it indicates in a general way the relative distribution of minerals in the rock. A recast of the chemical analysis indicates a substantially similar distribution of minerals. Based on the chemical analysis of the rock the percentage composition would be very closely:

| | Per cent |
|---|---|
| Zoisite: $4CaO.3Al_2O_3.6SiO_2.H_2O$ | 22.0 |
| Albite: $Na_2O.Al_2O_3.6SiO_2$ | 55.0 |
| Sericite: $K_2O.3Al_2O_3.6SiO_2.2H_2O$ | 13.0 |
| Microcline: $K_2O.Al_2O_3.6SiO_2$ | 5.0 |
| Quartz: $SiO_2$ | 3.0 |
| Titanite: $CaO.TiO_2.SiO_2$ | |
| Garnet: $3CaO.Al_2O_3.3SiO_2$ | 2.0 |
| Clino-zoisite: $4CaO.3Al_2O_3.6SiO_2.H_2O$ | |
| Apatite: $(CaF)Ca_4(PO_4)_3$ | |

Since the rock occurs naturally in Virginia, I have chosen to designate it as Virginia zoisitic rock, and it will be referred to in this specification and the appended claims by this name. Instead of this Virginia zoisitic rock, other suitable rock containing substantial quantities of zoisite together with alkali aluminum silicates such as albite, sericite and microcline can be similarly used.

This Virginia zoisitic rock has important advantages as a ceramic flux and may be substituted for all the feldspar and a small part of the flint in such typical white ware bodies as floor and wall tile, electrical porcelain, semi-porcelain dinnerware, vitreous china, sanitary ware and high tension insulators. It may also be used with advantage as a partial substitute for feldspar, particularly in bodies containing more than 15% of feldspar. It may also be substituted for whiting or marble dust when these materials are incorporated into earthenware bodies.

The amount of zoisitic rock which is used in making the earthenware bodies may vary considerably depending upon the particular kind of material which is desired as a final product. In general, the amount of zoisitic rock may vary from a few per cent up to around 60% and even as high as about 70%, and it may be used in conjunction with various other materials such as, for example, whiting, magnesite, pyrophyllite, talc, etc. A given amount of calcium when introduced as zoisitic rock is very effective in decreasing the moisture expansion. Hence but small amounts of calcium oxide are required when introduced as zoisitic rock in order to produce a decrease in the moisture expansion, as little as 0.3% of calcium, calculated as calcium oxide, introduced into an earthenware body as zoisitic rock causing a marked decrease in moisture expansion. For some purposes a larger amount is desirable and I have found that in white ware bodies the quantity of calcium introduced as zoisitic rock may vary from 0.3% to 5.0%, calculated as calcium oxide.

The proportion of clay may vary from about 25 to 50% and the clay may be made up in part of Ball clay and in part of Georgia or Florida kaolin. Other clays such as English china clay, English ball clay and North Carolina kaolin etc. may also be used.

Flint may be used in varying amounts and may constitute from about 5 to 35% or even 40% of the earthenware body.

The moisture expansion of ceramic bodies is commonly determined by subjecting them to a steam pressure of about 150 pounds for a given length of time and then measuring the increase in length, if any, which the body has undergone. The following table shows the decrease in moisture expansion produced in semi-porcelain dinnerware bodies in which Virginia zoisitic rock has replaced all of the feldspar. The semi-porcelain bodies were subjected to 150 pounds steam pressure for a period of about 3 hours.

*Semi-porcelain dinnerware bodies*

| | 1 | 2 | 3 |
|---|---|---|---|
| | Per cent | Per cent | Per cent |
| Flint | 35.0 | 35.0 | 30.0 |
| Feldspar | 12.0 | | |
| Ball clay | 32.0 | 32.0 | 32.0 |
| Georgia kaolin | 21.0 | 21.0 | 21.0 |
| Virginia zoisitic rock | | 12.0 | 17.0 |
| Moisture expansion in percent of original length. 3 hrs. at 150# steam pressure | 0.123 | 0.071 | 0.062 |

The table shows that body 2 has a moisture expansion which is about 42% less than that of body 1, and that body 3 has a moisture expansion which is about 50% less than that of body 1. Although the above table gives data only with respect to semi-porcelain dinnerware bodies, it is of course understood that the zoisitic rock will not only decrease the moisture expansion of those particular bodies, but will decrease the moisture expansion of ceramic bodies generally.

The use of zoisitic rock also has many other advantages. It decreases the maturing point of white ware bodies several cones without affecting other properties of the bodies. It increases the firing range of vitreous bodies, especially those containing calcium.

When whiting or marble dust used in earthenware bodies is replaced by zoisitic rock, the firing range of the bodies is not affected by the zoisitic rock to as great an extent as it is by the whiting or marble. In addition, the zoisitic rock improves the fired color of the bodies.

I have also found that the properties of clay slips containing calcium are improved if zoisitic rock is used instead of whiting and marble. In making casting slips, it is common to add dispersing agents such as sodium silicate, soda ash, or the like to deflocculate the clay. It is known that both lime, in the form of whiting or marble, and magnesite tend to flocculate a clay slip.

Consequently, when such materials are present in a slip, it is necessary to use considerably larger quantities of the dispersing agents. I have found that when zoisitic rock is substituted for whiting or marble or magnesite, a much smaller amount of dispersing agent is needed to produce a satisfactory casting slip. The dispersing agents usually contain various soluble salts and a decrease in the amount of these materials present in a casting slip increases the life of the plaster molds into which the slip is poured. The improved results which may be obtained when zoisitic rock is used in casting slips are illustrated in the following table:

*Vitreous china bodies*

| | 1 | 2 | 3 | 4 |
|---|---|---|---|---|
| | Per cent | Per cent | Per cent | Per cent |
| Flint | 36.0 | 34.0 | 37.0 | 35.0 |
| A-2 feldspar | 18.0 | | 18.0 | |
| English china clay | 17.0 | 17.0 | 30.0 | 30.0 |
| Florida kaolin | 8.0 | 8.0 | | |
| North Carolina kaolin | 10.0 | 10.0 | 4.0 | 4.0 |
| English ball clay | 8.0 | 8.0 | 8.0 | 8.0 |
| Imported whiting | 2.0 | | 2.0 | |
| California magnesite | 1.0 | | 1.0 | |
| Virginia zoisitic rock | | 23.0 | | 23.0 |
| Per cent sodium silicate necessary to produce minimum viscosity | 0.606 | 0.281 | | |
| Per cent organic clay deflocculant necessary to produce minimum viscosity | | | 0.475 | 0.175 |

The table shows that body No. 2 in which Virginia zoisitic rock has replaced feldspar, whiting and magnesite requires about 54% less sodium silicate to disperse it than body No. 1. The table also shows that body No. 4, in which Virginia zoisitic rock has replaced feldspar, whiting and magnesite, requires about 63% less organic clay deflocculant than body No. 3.

This invention will be further illustrated by the following examples showing typical body formulae for various types of ceramic products, but it is not limited thereto:

| | Vitreous china | |
|---|---|---|
| Flint | 36.0 | 31.0 |
| Ball clay | 8.0 | 7.5 |
| Florida kaolin | 8.0 | 8.0 |
| North Carolina kaolin | | 10.0 |
| English china clay | 28.0 | 18.0 |
| Whiting | 2.0 | |
| Magnesite | | 0.5 |
| Virginia zoisitic rock | 18.0 | 25.0 |

| | Sanitary ware | | Electrical porcelain | |
|---|---|---|---|---|
| Flint | 26.0 | 24.0 | 25.0 | 20.0 |
| Ball clay | 18.0 | 20.0 | 12.0 | 25.0 |
| Florida kaolin | | | 13.0 | 8.0 |
| North Carolina kaolin | 7.0 | 10.0 | | |
| Georgia kaolin | | 8.0 | 10.0 | 10.0 |
| English china clay | 21.0 | 8.0 | 5.0 | |
| Whiting | | 1.0 | | |
| Virginia zoisitic rock | 28.0 | 29.0 | 35.0 | 37.0 |

| | Wall tile | Floor tile |
|---|---|---|
| Flint | 15.0 | 10.0 | 15.0 | 10.0 |
| Ball clay | 18.0 | 22.0 | | |
| Florida kaolin | | | 30.0 | 20.0 |
| Georgia kaolin | 18.0 | 15.0 | | 10.0 |
| Magnesite | 3.0 | | | |
| Virginia zoisitic rock | 3.0 | 7.0 | 55.0 | 60.0 |
| Pyrophyllite | 37.0 | 41.0 | | |
| Talc | 6.0 | 5.0 | | |

The above body formulae are given by way of example. The invention is not limited thereto, but other formulae can be used.

The invention includes not only the use of Virginia zoisitic rock, but also other similar zoisitic rock, in making earthenware bodies. As previously pointed out the Virginia zoisitic rock need not be used as the exclusive flux in making the new bodies, but it may be used in conjunction with feldspar or other suitable fluxing agents. It may likewise be used as the sole source of calcium to decrease moisture expansion or it may be used in conjunction with materials such as whiting or marble dust.

The methods of manufacturing the new ceramic products containing the zoisitic rock depend somewhat on the purpose for which the products are intended.

In making semi-porcelain dinnerware the body materials may be weighed out, thoroughly mixed with about 60% of water, lawned, filter-pressed and then put through a pug mill or de-airing machine. This pugged material may be used for plastic forming of the flatware and dishes. Hollow ware such as sugars, creams and cover dishes, may be made by a casting process in which the filter press cakes are blunged up with a small amount of water to which has been added a dispersing agent. The dispersing agent is added to decrease the amount of water necessary to make a fluid slip and to decrease shrinkage. The slip is poured into plaster molds, the body being deposited on the sides of the mold as the water is absorbed. After standing for a few minutes, the excess slip is poured out and the ware is permitted to stand in the molds for a short time until it shrinks away from the sides of the mold, when it is taken out, dried and finished. Both the dry finished hollow ware and the flatware may then be placed in saggers which are in turn placed in a biscuit kiln and fired to about cone 6 to 9. On cooling, the biscuit ware is removed from the kiln and is then brushed and glazed either by dipping or spraying. The glazed ware is again placed in the saggers and fired a second time in a gloss kiln to about cone 1 to 5.

Bodies for the manufacture of vitreous china may be formed in much the same way as those for semi-porcelain dinnerware. However, in order to obtain sufficient vitrification with a minimum of flux, vitreous china is biscuit fired at about cone 10 to 12 and, after glazing, is gloss fired from about cone 01 to 3.

In the manufacture of wall tile the body materials may be mixed with water and filter-pressed in much the same way as semi-porcelain dinnerware. If the dry press method is used, the filter press cakes are dried and ground and sufficient water for pressing, usually about 10 to 14%, is added to the ground body. The moistened body is then permitted to stand in a bin for about 12 hours and is then put through a dust mill and screened and then pressed into tile on hand or automatic presses. The tile are placed in saggers and biscuit fired at about cone 7 to 11 depending on the type of body. The biscuited tile are then glazed by dipping or spraying and are fired again to about cone 1 to 6. The tile may also be made by the one-fire process in which the green tile is sprayed with glaze and the body and glaze are fired at the same time, the glaze being such that it will mature at the same temperature as the body.

Wall tile containing zoisitic rock may also be prepared by the dry process, in which the various components of the body are ground to about 200 mesh and are then mixed with the required amount of water necessary for pressing the body.

Floor tile may be formed by the same methods that are used in preparing wall tile, but are fired at a different temperature. Floor tile are vitreous and are seldom glazed, and they are fired in a biscuit kiln at a higher temperature than wall tile in order to obtain sufficient vitrification with a minimum of flux content. The biscuit temperature varies from about cone 10 to 13.

Electrical porcelain (low tension) is also vitreous and may be manufactured in much the same way as floor tile with a firing range from about cone 9 to 12.

Sanitary ware containing zoisitic rock may be made by a casting process with one or two firings depending upon the composition and the purpose for which the ware is intended. The firing temperature may vary from about cone 8 to 12.

I claim:

1. Ceramic bodies made from a mixture comprising flint, clay and a zoisitic rock as herein defined.

2. Ceramic bodies made from a mixture comprising flint, clay and a zoisitic rock comprising about 22% zoisite, about 55% albite, about 13% sericite and about 5% microcline.

3. Ceramic bodies made from a mixture comprising flint, clay and a zoisitic rock comprising at least 15% zoisite, at least 55% albite, and at least 10% sericite.

4. Ceramic bodies made from a mixture comprising flint, clay and a zoisitic rock as herein defined, the amount of zoisitic rock being such that the earthenware bodies contain from about 0.3 to about 5% of calcium calculated as calcium oxide.

5. Ceramic bodies made from a mixture comprising flint, clay and Virginia zoisitic rock as herein defined.

6. Ceramic bodies made from a mixture comprising flint, clay, pyrophyllite and a zoisitic rock as herein defined.

7. A raw ceramic batch comprising comminuted flint, clay and a zoisitic rock as herein defined, the amount of zoisitic rock being such that the batch contains from about 0.3 to about 5% of calcium calculated as calcium oxide.

8. A raw ceramic batch comprising comminuted flint, clay and Virginia zoisitic rock as herein defined.

9. A raw ceramic batch comprising comminuted flint, clay, pyrophyllite and a zoisitic rock as herein defined.

10. Ceramic bodies made from a mixture comprising flint, clay, feldspar and a zoisitic rock as herein defined.

IRA ELMER SPROAT.